United States Patent [19]
Kolbe

[11] 3,851,893
[45] Dec. 3, 1974

[54] VEHICLE BANKING ARM CONSTRUCTION

[76] Inventor: Joachim Kolbe, 5126 Haskell Ave., Encino, Calif. 91316

[22] Filed: July 23, 1973

[21] Appl. No.: 381,991

[52] U.S. Cl............................................ 280/112 A
[51] Int. Cl............................................. B60g 7/04
[58] Field of Search......... 280/112 A, 112 R, 124 R

[56] References Cited
UNITED STATES PATENTS

| | | | |
|---|---|---|---|
| 2,350,353 | 6/1944 | Heftler | 280/124 R |
| 3,556,553 | 1/1971 | Kolbe | 280/112 A |
| 3,726,542 | 4/1973 | Kolbe | 280/112 A |

Primary Examiner—Robert B. Reeves
Assistant Examiner—Thomas E. Kocovsky
Attorney, Agent, or Firm—Andrus, Sceales, Starke & Sawall

[57] ABSTRACT

A curvebank vehicle superstructure is supported by curvebank arms which extend from the axles beyond the respective transversely extending lines interconnecting the related banking arm ball joints carried by the superstructure. The multiturn cushions carried by the superstructure are positioned at the ends of these extensions to secure torsional windup of the banking arm leaf springs while resisting downward movement of the extensions caused by upward movement of the axles. The multiturn cushions may thereby be placed into superstructure space sections available beneath the passenger seats, avoiding interference with the selected floor outline of the passenger compartment while in static height position and additionally during operation of the banking arms.

10 Claims, 4 Drawing Figures

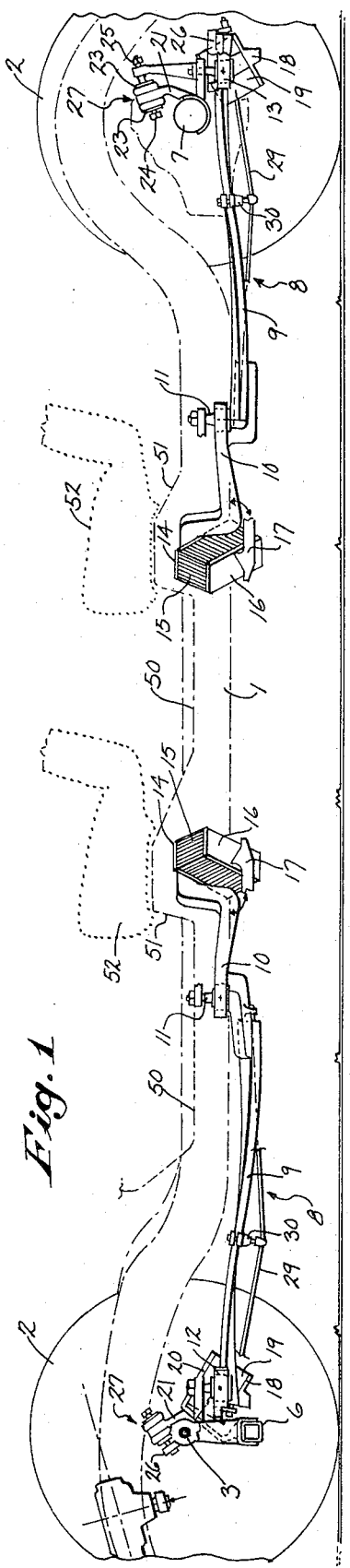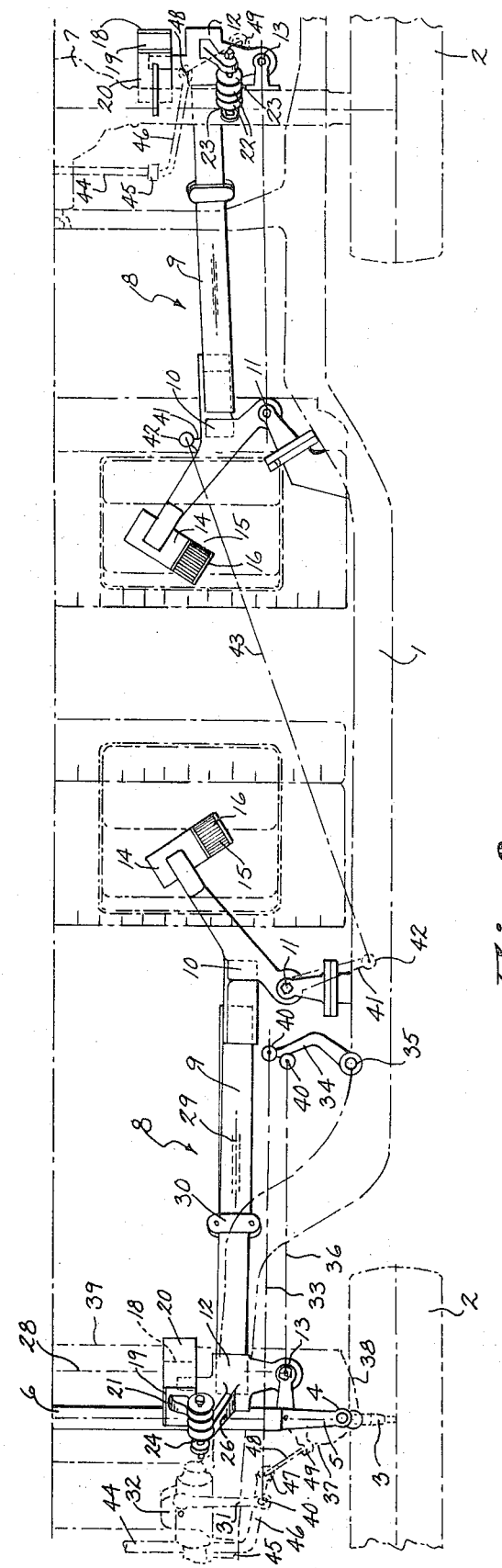

3,851,893

VEHICLE BANKING ARM CONSTRUCTION

CROSS-REFERENCES TO RELATED APPLICATIONS

This application is closely related to the Kolbe, U.S. applications, Ser. No. 185,765, filed Oct. 1, 1971 (Rigid Front Axle), Ser. No. 251,831, filed May 9, 1972 (Single Leaf Truss), and Ser. No. 324,754, filed Jan. 18, 1973 (Torque Control Pivot) by the present inventor, and the subject matter herein widens the field of structural application potential disclosed in said copending applications.

BACKGROUND OF THE INVENTION

1. Field of the Invention

This invention pertains to the suspension structure for automotive vehicles and the like, and in particular to an improved vehicle banking arm construction for resiliently supporting the superstructure of curvebank cars to secure inward leaning of the superstructure during curve ride of the vehicle. The subject matter of this invention constitutes the disclosure of potential additional locations for some of the elements constituting a banking arm and fitting into the geometric pattern which secures the desired inward lean of the vehicle superstructure, particularly under consideration of the limited space available in so-called small or compact cars.

2. Description of the Prior Art

The invention relates to banking arm constructions of the type disclosed in U.S. Pat. No. 3,181,883, issued May 4, 1965 (Rubber Cushions), U.S. Pat. No. 3,556,553, issued Jan. 19, 1971 (Polyurethane Cushions), as well as to the above cited related pending applications.

Heretofore, the selected positioning and operation of the superstructure carried multiturn cushions was confined to and kept within a space located between the respective superstructure carried banking arm ball joint pairs and the axle carried banking arm ball joint pairs and arranged outwardly from their longitudinally extending connecting lines between the ball joints of each related banking arm, located on each side of the vehicle. This position secured a desired windup of the related torsionally operated leaf spring from its frame supported end, whenever the axle supported end was lifted, progressively increasing the resilient resistance against such lift since the cushion support arm, resting nearly rigidly against the superstructure itself, would not participate on the lifting of the neighboring zone of the leaf spring, and thus forcing the spring leaf into a torsional deflection.

SUMMARY OF THE INVENTION

This invention discloses a new suitable location for the superstructure supported multiturn cushions and the operation of each cushion by means of a newly introduced banking arm extension directed toward the central part of the superstructure.

The main object of the invention is the coordination of the structural height of the banking arm at its maximum with the shape of the vehicle compartment floor to dispose the banking arm structure free from interference with the foot space needed for the vehicle occupants. Advantage is taken of the fact that a lifting of the axle supported end of the related banking arm is employed to increase the windup of the related torsionally operated leaf spring by means of the related positioning and anchoring of the respective superstructure carried multiturn cushions.

In general, the invention can be arranged in its structure to meet all the special characteristics and performance needs of curvebank arms disclosed in the related numerous patent applications cited above.

According to one characteristic of the invention the multiturn cushion at the inner end of each banking arm is disposed in the space beneath a seat of the superstructure where adequate room is available without requiring additional height for the superstructure.

According to another characteristic of the invention the multiturn cushions are arranged with the inner superstructure supported cushions actuating an extension of the banking arm beyond the position of the related ball joint to provide a reverse geometry actuation of the banking arm from that previously employed.

BRIEF DESCRIPTION OF THE DRAWINGS

The accompanying drawings illustrate the best mode presently contemplated of carrying out the invention.

In the drawings:

FIG. 1 is a side elevation of a banking arm supported vehicle superstructure including front and rear rigid axles and illustrating the superstructure carried multiturn cushions placed in accordance with this invention.

FIG. 2 is a half section of the banking vehicle chassis structure shown in FIG. 1 as it appears in top view in its static height position.

DESCRIPTION OF THE PREFERRED EMBODIMENT

Figure 3:
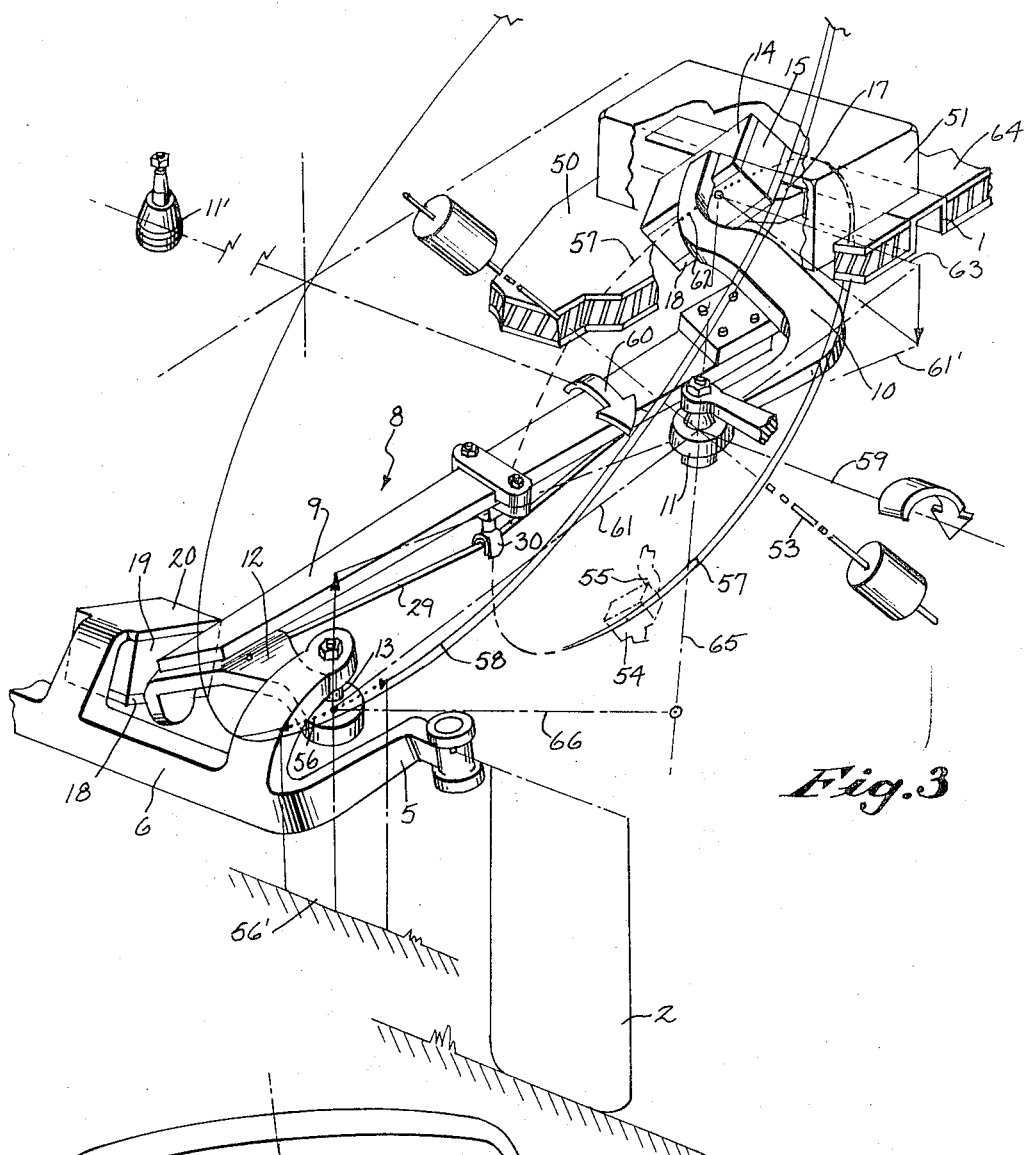
FIG. 3 is a perspective detailed view of a left hand front end banking arm shown as it fits into the related curvebank geometry pattern.

FIGS. 1 and 2 illustrate in side view and top view respectively a vehicle superstructure having a chassis or body support frame 1 supported by wheels 2 on the road. The left hand half only of the vehicle is shown in the top view and is assumed to be essentially mirror-like to the respective right hand half. The wheels 2 are arranged in pairs, one pair at the front and the other pair at the rear end of the vehicle. The wheels of each pair are disposed on opposite sides of the superstructure and are equally spaced from the longitudinal vertical center plane of the vehicle.

The front wheels each are, in the modification illustrated, supported by a wheel spindle member 3 pivotally connected by a kingpin pivot 4 to the outer end 5 of a rigid front axle 6 extending transversely between the two front wheels 2.

The rear wheels 2 are carrying a rigid axle housing structure 7. The front axle 6 and the rear axle housing 7 each are supporting the respective ends of a related pair of banking arms 8 which are supported at their other ends by the frame 1. Each banking arm 8 comprises a torsionally operated leaf spring 9, preferably in form of a single leaf connected at one end by a support bracket 10 for the support of the banking arm ball and socket joint 11 which connects said end of the banking arm 8 to the frame 1. The other end of the respective leaf spring 9 is held by the support bracket 12 for the support of the banking arm ball and socket joint 13 which connects said end of the banking arm 8 to the rigid axle 6 in the front and to the rigid axle housing structure 7 in the rear of the vehicle respectively.

Each support bracket 10 extends substantially horizontally, inwardly and diagonally in a direction toward the center section of the vehicle at a length of about ⅓ to ½ of the length of the related spring leaf 9 and carries at its end a rectangular operating plate 14 in a somewhat elevated position. The operating plate 14 is positioned inclined at an angle of approximately 45° relative to the road and at a somewhat larger angle relative to the longitudinal vertical center plane of the vehicle, with its lower edge being closer to said center plane than its upper edge and with both edges arranged substantially parallel to the road.

Each operating plate 14 rests against a multiturn cushion 15 fabricated as a substantially rectangular block of polyurethane based material and which rests against a lower carrier plate 16 which is connected by the bracket 17 to the frame 1.

Each support bracket 12 extends substantially sidewardly and inwardly and carries a rectangular operating plate 18 positioned inclined at an angle of about 32° relative to the road and substantially parallel to the direction of the longitudinal vertical center plane of the vehicle and, as appearing in top view, with its higher edge located in its vertical distance closer to the rigid front axle 6 than its lower edge, and this lower edge located closer to the rigid rear axle housing 7 than its higher edge. Each plate 18 supports a multiturn cushion 19 shaped similar to the multiturn cushion 15 and resting against the carrier plate 20 carried in effect by the respective rigid axle or axle housing structure nearest to it.

Each axle 6 and 7 carries an upwardly directed arm 21 which supports at its ring-formed upper end two cushions of resilient material 22 which are resting between two enclosure discs 23 and which are kept under pressure by a bolt 24 with corresponding end nuts 25.

Each support bracket 12 also carries an upwardly directed arm 26 which pivotally receives at its upper end the extended bolt 24. The pivotal assembly as a whole constitutes a so-called torque control pivot 27 which is selectively positioned to control any tendency of the related axle to rotate about its axis line 28 interconnecting the respective two banking arm ball joints 13 supported by the related axles in response to vertically directed wheel load reaction forces.

The torque control pivots transmit these forces by means of the related leaf springs 9 and the support brackets 10 to the frame 1 without the interposition of so-called torque rods. Torque control pivots and their functions are disclosed in the pending U.S. application Ser. No. 324,754 referred to above. The tendency of the torsionally operated leaf springs 9 to bend in reaction to the forces present in the system is overcome by the addition of a truss cable 29 arranged below and extending between the respective support brackets 11 and 12 for each spring leaf, whereby a truss column 30 is positioned between the spring leaf 9 and the truss cable 29. The exact positioning of the truss column 30 depends on the desired amount of bending deflection needed to have the torque control pivot 27 control the caster or upright position of the axle not only in static height suspension position but also during wheel oscillation and during curve-banking of the superstructure, as disclosed in the application for patent, Ser. No. 324,754 referred to above.

FIG. 2 further illustrates, schematically only, the front wheel steering linkage employed for a curvebank vehicle comprising a rigid front axle. The linkage comprises the horizontally extending lever 31 which might be considered the Pitman arm of the steering gear mechanism enclosed by a gear housing 32 mounted on the frame 1 to locate the arm as illustrated.

The lever 31 is pivotally connected at its outer end to a tie rod 33 supported by the lever arm 34 which in turn is pivotally supported by the vertically extending pivot 35 to the frame 1. The lever arm 34 also carries the backward end of the steering drag link 36, whose forward end is connected to the spindle arm 37. The spindle arm 37 extends into the steering arm 38. A cross steering tie rod 39 extends between the steering arm 38 and a corresponding steering arm located on the other side of the vehicle.

All tie rods and drag link ends are connected to their respective support arms by ball and socket joints 40.

Each of the two support brackets 10 located on one side of the vehicle also carries an arm 41 sidewardly extending in a direction opposite to that of the other corresponding arm in relation to the two end sections of the vehicle, and each of said arms 41 carries a ball and socket joint 42 on its free end, supporting the corresponding end of a front to rear tie rod 43, arranged to secure lateral operation in unison of the front and the rear pairs of banking arms 8 during the roll turn of the superstructure into a banked position.

The frame 1 supports a sway bar 44 at each end thereof as illustrated in FIG. 2, in bushings 45 with the longitudinally extending sway bar arm 46 at each end of the sway bar connected to the resilient bushing 47 at the upper end of a corresponding sway bar shackle 48 which in turn is connected at its lower end by resilient bushing 49 to the respective axle closest to it.

The outline of the passenger compartment floor 50 indicates the sheet metal elevations 51 below the respective seats 52 and the positioning of the frame supported banking arm multiturn cushions 15 below the seats. Sufficient space is available for the shear deformation of these cushions upwardly as they occur during superstructure curve-banking. The coordination of the shaping of the banking arms 8 and the vehicle floor outline required for a vehicle of a most desirable low overall profile is an object of this invention.

FIG. 3 illustrates how such coordination can be secured within the framework of the geometric pattern of the banking arm concept. The left hand front banking arm 8 as illustrated in FIG. 2 is shown in perspective in FIG. 3, set within the pattern of descriptive geometry outlines, to better explain how the many requirements of its functioning can be met by its newly devised shape. The dominating factor of the system is the carefully selected position of the banking arm axis 53 shown in a distinct outline extending between two small end cylinders, which allow a clear reading of its position relative to the three main planes of the vehicle.

The structural elements shown are given the numerals selected in FIGS. 1 and 2.

The vehicle front axle 6 supported by the wheel 2 carries the front banking arm ball and socket joint 13. The longitudinally extending torsionally operated leaf spring 9 is rigidly connected at its forward end to the support bracket 12, which extends from the ball and socket joint 13 to the lower operating plate 18 carrying the multiturn cushion 19 in turn resting against the upper carrier plate 20 supported by the axle 6. The spring leaf 9 is rigidly connected at its rearward end to the support bracket 10 which extends outwardly and forwardly to connect with the ball and socket joint 11 and also extends inwardly and backwardly to carry the upper operating plate 14 pressing against the multiturn cushion 15 resting upon the lower multiturn cushion carrier plate 16 which in turn is supported by and in effect forms a part of the vehicle frame structure 1. The truss cable 29 extending below the leaf spring 9 and the related cable column 30 are also shown in FIG. 3.

This frame supported multiturn cushion 15 has heretofore been placed in the illustrated position indicated as a small block 54 with its bottom side supported by the end of an arm section 55. The block functioned to secure the travel path 56 for the axle supported banking arm ball and socket joint 13 whenever the axle 6 repositioned itself relative to the superstructure during curvebanking of the vehicle. The block 54 travelled during that process along a carefully selected section along the periphery of the geometric eliptical plate 57 whose center is located at a selected point along the banking arm axis 53. The center of the ball joint 13 simultaneously travelled along the periphery of the eliptical plate 58 whose center is also located on a selected and coordinated point along the banking arm axis 53.

The block 54 also served to increase the torsional windup of the spring leaf 9 and therewith controlled the resistance of the wheel 2 whenever the wheel moved upwardly such as while travelling over an elevation in the roadbed. This control and increase in windup of the leaf spring 9 resulted from the fact that the top side of the block 54 rested against the vehicle frame itself. The block 54 therefore could not participate even partly in any upward movement of the axle 6 and the spring 9 while rotating about the axis line 59 extending transversely of the vehicle between the two banking arm ball and socket joints 11 and 11'. The frame in effect kept or pressed the block 54 down, which resulted in an additional windup during banking from a static position in a direction indicated by the arrow 60.

The reference to the previously disclosed structural arrangement and method of operation of the banking arm of the present invention, securing both the desired travel path 56 and the required windup operation of the leaf spring 9 during wheel oscillation, is here presented to describe the restrictions to be observed in the design of the banking arm 8 in its relations to both the superstructure and to the axles of the curvebank vehicle.

The position of the block 54 has usually been defined as being located one-third to one-half the distance along the length of the connecting line 61 away from the ball joint 11 and toward ball joint 13, and a selected distance outwardly from said line. The additional windup of the leaf spring was achieved by suppressing an upward movement of block 54 whenever the axle moved upwardly.

This invention is based on the discovery that a second zone is available for the position of the cushion 15 which secures both the travel path 56 and the required windup of the spring 9.

In FIG. 3, studying the geometric pattern illustrated suggests a second position for the frame supported multiturn cushion 15 as being available along the periphery of the circular plate 57 and located approximately the same distance away from the roadbed as the small block 54. With the travel along its peripheral section 62 as graphically illustrated by a succession of dots, during shear deformation of the muliturn cushion, the same travel path for the ball joint 13 can be secured as that established by the travel of the former small block 54.

Generally, the multiturn cushion 15 will be located approximately centrally between the longitudinal central vertical plane of the vehicle and a straight line passing through the center of the ball joints 11 and 13.

The second requirement of performance, additional torsional windup of the frame supported end of the leaf spring 9 during upward movement of the front axle will take place, although the windup force and the related leverage will not be determined by the tendency of the cushion 15 to move upwardly together with the neighboring section of the leaf spring 9 and blocked from doing so by the resistance of the superstructure frame against which the cushion rests firmly, but will now be determined by the reversal of motion related to the fact that the cushion 15 now is not placed between the ball joints 13 and 11 and outwardly from their line of connection, but placed longitudinally along the extension of the banking arm as represented in FIG. 3 by the line 61' and inwardly from said line to create the lever arm 63. With upward movement of the axle carried ball joint 13 the line 61 and its extension will swing about the transversely extending axis line 59 with the end of the extension moving downwardly. Where, without the frame bracket 17 the cushion 15 and its upper and lower enclosure plates would move also downwardly, the bracket 17 blocks such downward move and the resistance is converted into the desired windup of the frame supported end of the leaf 9, again as indicated by the arrow 60. As described above, the operating plate 14 rests on the cushion from above, while in the structure related to block 54 it rested against the block from below.

FIG. 3 illustrates a section of the superstructure compartment floor 64 and the enclosure pocket 51 under which the multiturn cushion 15 has room to operate. Illustrated is also the projection 56' of the travel path 56 for the axle supported ball joint 13 downwardly to the road bed, here appearing as a nearly truly transverse line which indicates, when related to an identical projection for the other side of the vehicle a maintaining of the axle 6 in a truly transverse position during the banking swing of the superstructure.

The new position for the multiturn cushion 15 furthermore will maintain the operating hinge line 65 extending from the center of the cushion 15 to the ball joint 11 and toward the related wheel, creating with the shortest distance from line 65 to the center of the ball joint 13 a lever arm 66 whose outer end, located at said ball joint 13, while tending to swing during wheel oscillation about the line 65 causes the shear motion in the cushion 15 accompanying the wheel oscillation and having a highly beneficial effect on the wheel rates, as disclosed in the respective Kolbe U.S. Pat. application Ser. No. 185,765, cited above.

Figure 4:
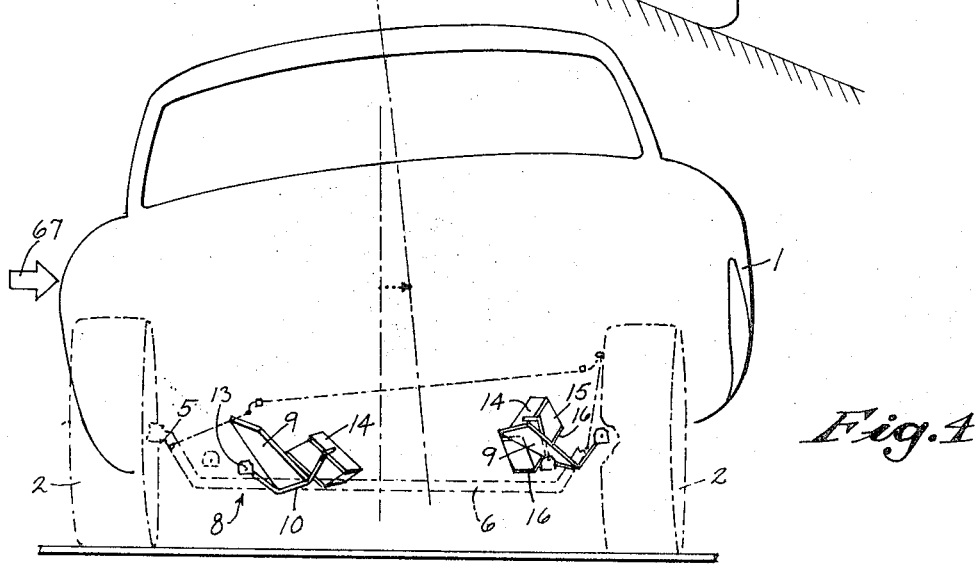
FIG. 4 is a schematic front elevation of the front end of the vehicle having its superstructure mounted as shown in FIGS. 1 and 2 and turned into a roll banked position, and in particular illustrating the positions thereby taken by certain of the related multiturn cushions.

FIG. 4 shows the superstructure 1 as pressed into the inwardly inclined position while under side pressure from the centrifugal force as represented by the arrow 67. The positions taken by the leaf springs 9, follow with their backward ends the roll motion of the superstructure, while the forward ends essentially maintain their relationships to the front axle. The shear deformation of the superstructure carried multiturn cushions is shown as well as — schematically — the support brackets 10 extending from the related ball joints 11 over the end supports for the leaf springs 9 to the upper, operating plates 14. Plate 14, located on the right side of the vehicle, as viewed from the driver, has moved downwardly relative to its related superstructure carried plate 16, the plate 14 located on the left side, has moved upwardly while the center of the cushion 15 has travelled along the travel arc 62 as shown in FIG. 3.

No torque control pivot 27, such as shown in FIGS. 1 and 2, is shown in FIG. 3 and 4 but the positioning of the multiturn cushion 15 in accordance with this invention will lead to a similar S-ing of the spring leaf 9 with coordinated placing of the truss cable column 29 as described in the "Single Leaf Case," U.S. Pat. application Ser. No. 324,754.

A height adjustable connection between the bracket 17 and the vehicle frame 1 such as disclosed in the U.S. Pat. No., 3,181,883, referred to above, and the floor structure can here also serve as a means to adjust the static height of the superstructure.

The structure disclosed herein is of special importance for the design of so called small cars and especially sport cars, where low overall profile of the car secures less wind resistance at high speeds, and where shorter wheel base and smaller vehicle wheel track benefit from a lower floor made possible by this invention, which thereby make the many additional advantages of the curvebank car concept available to that class of cars as well.

Various modes of carrying out the invention are contemplated as being within the scope of the following claims particularly pointing out and distinctly claiming the subject matter which is regarded as the invention.

I claim:

1. In a vehicle of the class described, having a superstructure, a banking support for the superstructure connecting the superstructure at its forward end to a wheel spindle carrying wheel supported rigid front axle structure and at its rearward end to a rigid wheel supported rear axle housing structure, said banking support comprising a plurality of pairs of cooperating roll banking arms, each arm including a longitudinally extending torsionally operated resilient spring means connected by a separate support member and a ball and socket joint at one end to the superstructure and at the other end to the respective rigid axle structure, a side lever arm forming a part of said separate support member and bearing at its end against a resilient multiturn cushion of polyurethane based material placed near the outer end of the resilient spring means with the ball joint and the multiturn cushion placed a selected distance longitudinally of the vehicle from the related axle structure, and a side lever forming a part of the respective support member and bearing at its end againat a resilient multiturn cushion of polyurethane based material supported by the superstructure, each rigid transversely extending axle structure having a predetermined orientation as appearing in side view during static loading of the superstructure by means of a torque control pivot pivotally interconnecting the related axle structure and at least one of its related banking arms to secure and control said orientation of the related axle structure and to carry the axle torque pressures to the superstructure through said resilient means, wherein the improvement comprises the placing of said superstructure side lever carrying at its end the related multiturn cushion, into a position extending diagonally toward the median section of the vehicle and beyond the corresponding end of said spring means a length of about one-third to one-half of the distance between the respective axle supported and superstructure supported banking arm ball and socket joints, to secure elongation of the banking arm for improved space use within the vehicle superstructure.

2. The vehicle of claim 1 wherein said frame supported multiturn cushion is of an elongated shape positioned at an of approximately 45 degrees to the roadbed and of approximately 60 degrees to the longitudinally and vertically extending center plane of the vehicle, with the lower edge of the upper, operating, plate therefor positioned closest to said vehicle center plane.

3. The vehicle of claim 1 wherein the center of said frame supported multiturn cushion is located approximately centrally between the extension of a line connecting the related axle supported and frame supported banking arm ball joints and the longitudinally and vertically extending vehicle center plane.

4. The vehicle of claim 1 wherein said torsionally operated resilient spring means is connected at its axle supported end section to said separate support member at an angle of approximately 22° inclined inwardly toward the center of the related axle structure and is connected at its frame supported end to the related separate support member at an angle of approximately 22° inclined outwardly, with its lower side edge directed toward the lower outside of the vehicle, to thereby exert increased resilient resistance on the torsionally operated spring means during upward move of the related axle or axle end section.

5. The vehicle of claim 1 wherein the position of the related frame supported multiturn cushion coincides with an elevated enclosure panel in the vehicle floor preferably extending below the related nearest vehicle passenger seat, thereby securing position and operating space for that cushion without interference with the inner floor foot space required within the passenger compartment.

6. The vehicle of claim 1 wherein the designed elongation constitutes a superstructure carried structural section including said side lever and the multiturn cushion carried by it, which extends as a cantilever beyond the transversely extending line connecting the two frame supported banking arm ball joints, said cantilever creating a diagonally extending axis line determined by the centers of the related ball and socket joint and multiturn cushion and forming the substantially horizontally extending axis of the effective banking universal joint whose other axis as banking arm axis extends inclined to the three main planes of the vehicle.

7. The vehicle of claim 1 wherein the suspension and the resilient support means for the superstructure also comprise at least one transversely extending sway bar carried by the superstructure and operated by a pair of inclined sway bar shackles connecting substantially longitudinally extending sway bar arms to the related rigid axle structure, and wherein the suspension means additionally comprise a tie-rod operably extending longitudinally between one roll banking arm in the front of the vehicle and one rear roll banking arm to secure track holding of the pairs of the front wheels relative to the rear wheels.

8. The vehicle of claim 1 wherein the frame carried support for the related multiturn cushion is placed below the cushion and wherein said superstructure supported side lever, extending diagonally toward the median section of the vehicle compresses with its end section said multiturn cushion from above while transmitting vehicle support forces created by the related torsionally operated resilient spring means, in order to secure freedom for the shear deformation of the multiturn cushion in a direction which maintains the amount and directions of forces active at the axle supported end of the leaf spring within the elongated banking arm.

9. The vehicle of claim 8 wherein the center of said frame supported multiturn cushion is located approximately centrally between the extension of a line connecting the related axle supported and frame supported banking arm ball joints and the longitudinally and vertically extending vehicle center plane.

10. The vehicle of claim 8 wherein the designed elongation constitutes a superstructure carried structural section including said side lever and the multiturn cushion carried by it, which extends as a cantilever beyond the transversely extending line connecting the two frame supported banking arm ball joints, said cantilever creating a diagonally extending axis line determined by the centers of the related ball and socket joint and multiturn cushion and forming the substantially horizontally extending axis of the effective banking universal joint whose other axis as banking arm axis extends inclined to the three main planes of the vehicle.

* * * * *